Figure 1:
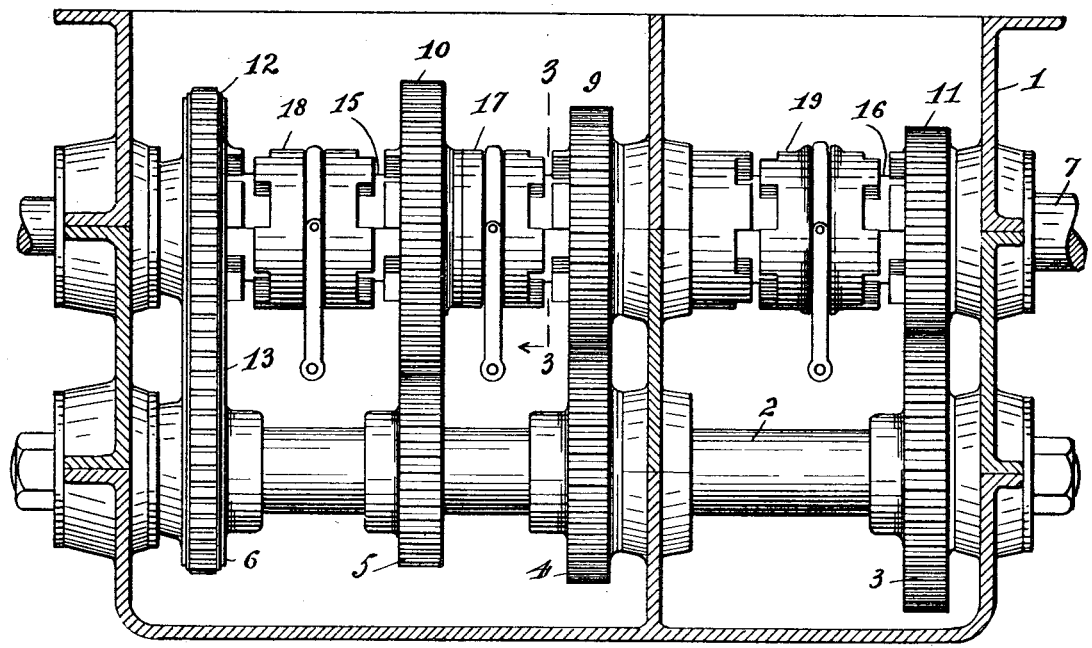

J. P. JOHNSON.
TRANSMISSION MECHANISM.
APPLICATION FILED SEPT. 2, 1914.

1,182,379.

Patented May 9, 1916.

Witnesses:

Inventor
James P. Johnson
by his Attorney

UNITED STATES PATENT OFFICE.

JAMES PONTUS JOHNSON, OF CLEVELAND, OHIO.

TRANSMISSION MECHANISM.

1,182,379.     Specification of Letters Patent.     Patented May 9, 1916.

Application filed September 2, 1914. Serial No. 859,833.

*To all whom it may concern:*

Be it known that I, JAMES PONTUS JOHNSON, a citizen of the United States, residing at Cleveland, in the county of Cuyahoga and State of Ohio, have invented certain new and useful Improvements in Transmission Mechanism, of which the following is a specification.

This invention relates to improvements in the speed changing mechanism employed in the transmission of power from the motor to the wheels of motor driven vehicles, and it has for its object the provision of a durable, economical and efficient means whereby the several speed changes and the reverse are obtained in a positive manner with a minimum amount of wear on the operative parts.

In the improved construction the co-acting gears are in constant mesh, but are not necessarily in constant operation during the driving action of the motor, thereby increasing the life of the mechanism and reducing the noise attendant to the operation.

The present invention relates particularly to an improvement in the construction of a transmission mechanism for which I have made application for Letters Patent, said application bearing date of April 22, 1914, and Serial No. 833,682. In a number of respects the embodiment of the invention as illustrated, is similar to that shown in the former application above referred to. In both cases the coöperating gears are in constant mesh, and the functions of the jack-shaft are substantially the same.

The present invention consists principally in the construction provided for the direct drive.

To facilitate the understanding of the invention, the accompanying drawing is made a part of the specification, and similar characters of reference are used to designate similar parts throughout the several figures of the drawing and in the description.

Figure 2:
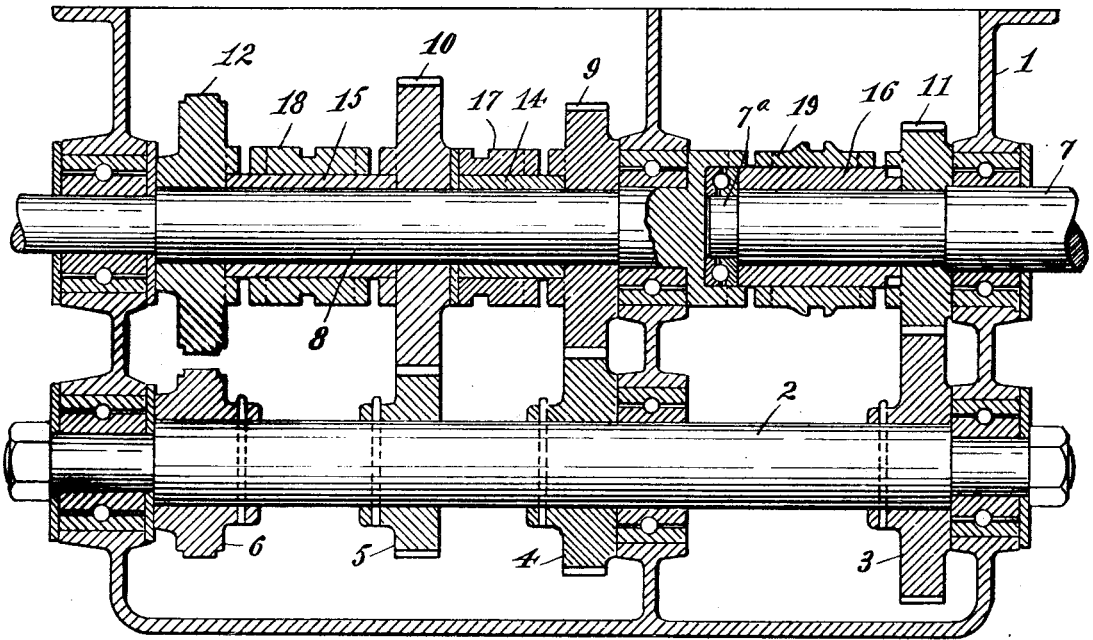
Figure 3:
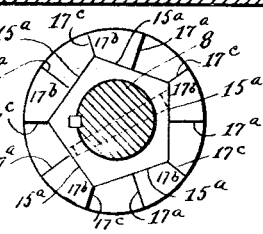

In the drawing Figure 1 is a view of the assembled mechanism showing the casing or housing in section and the operative parts in a neutral position. Fig. 2 is a central, vertical, longitudinal section, and Fig. 3 is a vertical section on line 3—3 Fig. 1.

In the drawing three different speeds and reverse are shown; it will however be understood that the number of speed changes is not arbitrary.

Referring now to the drawing, 1 represents the casing. Journaled in suitable bearings in the casing is a jack-shaft 2. The jack-shaft, as shown carries three spur gears 3, 4 and 5, and a sprocket 6, all of which are made fast to said shaft and thereby revolve with the shaft. The gears 3, 4 and 5 are of different diameters. The main driving shaft 7 is connected with the motor shaft (not shown) by any ordinary suitable clutch, and the shaft 8 is connected with the wheel-driving differential by a universal joint. The shafts 7 and 8 are in alinement, and the end 7ª of the shaft 7 is journaled in the end of the shaft 8, as shown in Fig. 2.

Gears 9 and 10 are mounted loose on the shaft 8, and are of different diameters, adapting them to engage the gears 4 and 5, with which they are in constant mesh. A gear 11 is mounted loose on the shaft and 7 is in constant mesh with the gear 3, on the jack-shaft. A sprocket 12 is mounted loose on the shaft 8, and is in alinement with the sprocket 6. Operative connection is provided for the sprockets 12 and 6 through the medium of a sprocket chain 13, preferably of the noiseless type.

Sleeves 14 and 15 are pinned and keyed to the differential drive shaft 8. These sleeves act as spacers and provide means for retaining the gears 9 and 10 in mesh with the gears 4 and 5, and the sprocket 6 in alinement with the sprocket 12. A similar sleeve 16 is attached to the main drive shaft 7, and provides means for retaining the gear 11 in mesh with gear 3. Clutch members 17, 18 and 19 are mounted on the sleeves 14, 15 and 16 respectively. The clutch members are adapted to slide longitudinally on the sleeves and to revolve with said sleeves and their connected shafts. A preferable construction, which is both economical to manufacture and highly efficient in operation, is best illustrated in Fig. 3. This construction provides a sleeve with a circular bore to accommodate the shaft, and five plain faces 15ª. The clutch members have a five faced bore, adapting them to fit the five faced sleeve, thereby allowing a longitudinal movement of the clutch member on the sleeve, but preventing any rotary movement of the clutch member relative to the sleeve, the sleeve, clutch member and shaft on which they are mounted revolving together. This construction admits of the provision of a five tooth jaw clutch of maximum efficiency, the working faces 17ª of the teeth 17ᵇ being of greater area than the faces 17ᶜ.

The free end 8ᵃ of the shaft 8 is provided with a clutch member adapted to mesh with the clutch member 19, and the loose gears and sprockets 9, 10, 11 and 12 have clutch members which are adapted to mesh with the clutch members 17, 18 and 19.

In the means for the direct drive lies the principal difference between the present invention and my former transmission device, hereinbefore referred to.

By referring to Figs. 1 and 2, which illustrate the improved mechanism in neutral position, it will be noted that the main drive shaft 7 is disconnected from the entire operative system, and is free to revolve, while the differential drive shaft 8, jack-shaft 2, and all gears and sprockets remain at rest. When it is desired to drive direct, the clutch member 19 is thrown into mesh with the clutch member on the free end of the shaft 8, thereby locking the main drive shaft to the differential drive shaft. The gears 9, 10 and 11, and their shafts, and the clutch members 17, 18 and 19 being out of engagement with said gears and sprocket, all remain at rest. The jack-shaft also remains at rest, as the gear 11 in mesh with the gear 3 provides the actuating means for said jack-shaft. When low speed is desired, the clutch member 19 is brought into engagement with the gear 11, and the clutch member 18 into engagement with the gear 10, the clutch 17 remaining neutral. The drive is thereby through the medium of the gears 11 and 3, jack-shaft 2, and gears 5 and 10 to the differential shaft 8. For intermediate speed, the clutch 19 is in engagement with gear 11, clutch 17 engaging gear 9, and clutch 18 neutral. For reverse action clutch 19 is in engagement with gear 11, clutch 18 engaging sprocket 12, and clutch 17 neutral.

It will readily be seen from the foregoing that, during the high speed or direct drive operation of the mechanism, all the coöperating members except the two drive shafts are at rest, thereby eliminating noise and a vast amount of wear on the operative parts.

The improvement is applicable to spur or spiral gear construction, and is durable, economical and highly efficient.

What I claim and desire to secure by Letters Patent is—

In mechanism for the purpose described the combination of a main drive shaft; a shaft to be driven arranged in alinement with said drive shaft, the drive shaft having a bearing in the shaft to be driven; a gear loosely mounted on the drive shaft; a jack-shaft arranged parallel to the first named shafts; gears of different diameters carried by said jack-shaft, one of said gears being constantly in direct mesh with the loose gear on the drive shaft; gears loosely mounted on the shaft to be driven, said gears being in alinement and constantly in direct mesh with gears on the jack-shaft; clutch members on the loose gears; spacing sleeves having a series of plane longitudinal exterior surfaces, fixed to the shaft to be driven and to the drive shaft; clutch members having a series of plane longitudinal interior surfaces slidable on said sleeves to register with the clutch members on the gears for connecting and disconnecting the loose gears with the driven shaft and for locking the drive shaft to the driven shaft without locking thereto any of the gears which are loosely mounted on said shafts, and for connecting the loose gear mounted on the drive shaft with said shaft.

JAMES PONTUS JOHNSON.

Witnesses:
L. F. GRISWOLD,
O. W. LARSON.